United States Patent Office 3,830,879
Patented Aug. 20, 1974

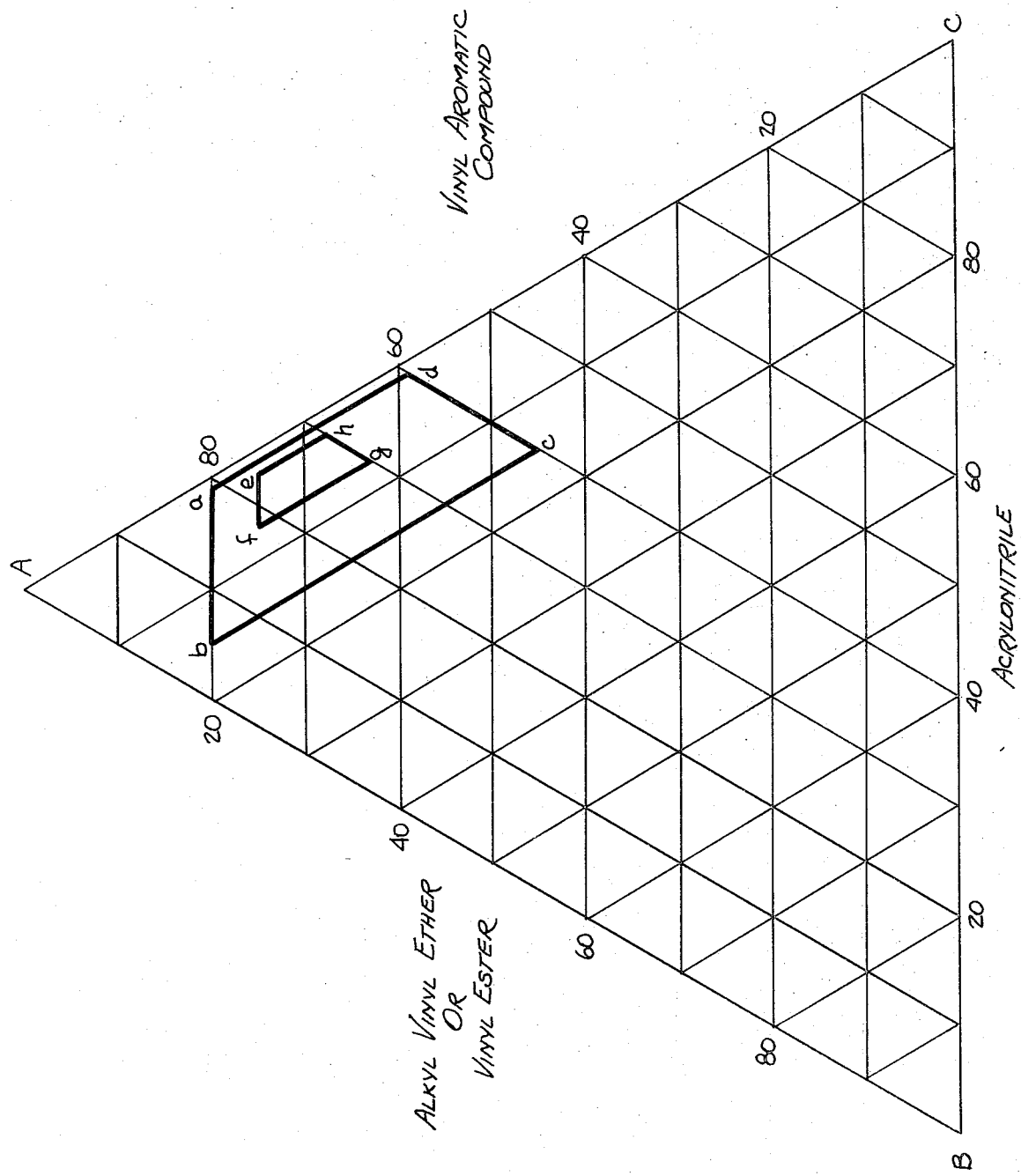

3,830,879
POLYBLEND COMPRISING GRAFT COPOLYMER AND RESINOUS TERPOLYMER
Ronald E. Stark, Naugatuck, Conn., assignor to Uniroyal, Inc., New York, N.Y.
Filed Dec. 23, 1971, Ser. No. 211,697
Int. Cl. C08f 19/08, 19/10
U.S. Cl. 260—876 R          5 Claims

ABSTRACT OF THE DISCLOSURE

The present invention relates to the improvement of the impact/flow balance of thermoplastic polymer formed by polymerizing a small amount of an alkyl vinyl ether and vinyl ester in combination with acrylonitrile-butadiene-styrene monomers.

BACKGROUND OF THE INVENTION

1. Field of the Invention

The present invention relates to the improvement of the impact/flow balance of thermoplastic polymer formed by polymerizing a small amount of an alkyl vinyl ether and vinyl ester in combination with acrylonitrile-butadiene-styrene monomers.

2. Description of the Prior Art

The bulk-suspension process of acrylonitrile-butadiene-styrene interpolymer used to prepare ABS polymers is well known. The general procedure is that styrene and acrylonitrile and/or equivalent monomers such as alpha-methylstyrene or methacrylonitrile are polymerized in the presence of a gel-free rubber dissolved in said monomers. As the reaction proceeds, but before the reaction mixture becomes too viscous to stir in a conventional reactor, the prepolymer formed as a result of the partial polymerization is suspended as small droplets in an aqueous solution of poly(vinyl alcohol) or similar suspending agent. The reactants are agitated until the reaction is complete and the polymer droplets are hard beads.

When preparing ABS by this method, as indicated in British Pat. 1,030,943, it is difficult to obtain an ABS polymer having good processing characteristics as well as high impact strength. Such a combination of properties is required if a polymer is to be acceptable for injecting molding.

In order for a material to be acceptable as an injection molding compound, it must become sufficiently flowable, under the influence of heat and applied injection pressure, to flow readily through the relatively small opening or gate in an injection mold, and the material must be sufficiently fluid to fill out the entire mold cavity, which frequently consists of an intricate pattern including many relatively restricted areas.

To illustrate the problem, good impact strength for ABS, i.e., greater than 3 ft. lbs./in. of notch (ASTM D256–56), can be obtained with as little as 8% rubber but the melt flow, and therefore the processability, is quite poor. The melt flow properties can be improved by increasing the amount of chain transfer agent used in the reaction, giving the polymer a lower resin molecular weight. If the amount of chain transfer agent is increased and acceptable flow is obtained so that the polymer may be injection molded, the impact strength is decreased to an undesirable level, e.g. less than 2 ft. lbs./in. of notch at 10% rubber.

French Pat. 1,385,118 discloses the preparation of impact plastics which are prepared by grafting styrene or styrene and acrylonitrile onto a butadiene-acrylate-alkyl vinyl ether spin. This graft can be blended with styrene-acrylonitrile resin to give the final product.

Belgian Pat. 641,496 and U.S. Pat. 3,275,712 disclose the preparation of a high impact thermoplastic material in which styrene-acrylonitrile resin is blended with a graft composed of styrene and acrylonitrile grafted onto a rubbery acrylate—alkyl vinyl ether—acrylonitrile spine. The alkyl vinyl ethers used were methyl vinyl ether and isobutyl vinyl ether.

Alkyl vinyl ethers are commonplace as internal lubricants in polyvinyl chloride (PVC). The general effect of copolymerization of alkyl vinyl ethers with vinyl chloride is to give a copolymer which is more processable than PVC because the tensile strength, hardness, softening point and viscosity are reduced. The addition of alkyl vinyl ethers to vinyl chloride prior to polymerization aids the processability of a PVC resin, however, there is no reason to expect it to work favorably toward improving the impact/flow balance in ABS polymers because vinyl acetate, a useful comonomer in preparing vinyl resins, does not substantially affect the impact/flow balance when used in ABS. Likewise, small amounts of acrylates as methyl acrylate and ethylhexyl acrylate are not useful in ABS polymers although they are copolymerized with vinyl chloride to give an improved vinyl resin.

3. Summary of the Invention

The present invention relates to a method for the improvement of the impact flow balance in ABS polymers. To effect the improvement, a small amount of alkyl vinyl ether and/or vinyl ester monomer is interpolymerized with an elastomeric spine polymer, styrene, acrylonitrile and/or equivalent or substitute monomers, e.g., methyl methacrylate, usually found in ABS or ABS-type polymers. The alkyl vinyl ether or vinyl ester monomers are limited to those in which the alkyl group, linear or branched, contains more than four carbons. In particular, monomers such as cetyl vinyl ether, octadecyl vinyl ether and ethyl hexyl vinyl ether have been used effectively.

As a result of the present invention the polymer impact/flow balance of ABS can be greatly improved if a particular alkyl vinyl ether or vinyl ester is added to the styrene and acrylonitrile monomer mixture in the beginning of the prepolymerization stage and is interpolymerized with the styrene and acrylonitrile monomers. Unlike the prior art compositions, the resultant polymer exhibits the easy flow characteristics which make it acceptable as an injection molding compound and it also has the high impact resistance desired for many applications. In general, the impact/flow balance is unexpectedly improved.

It has been found that the incorporation of said alkyl vinyl ethers and vinyl esters into the graft and/or resin portions of the ABS type polymer blends, as taught by this invention, is unexpectedly much more effective towards establishing an improved impact/flow balance than if said ether and ester monomers are part of the elastomeric spine polymer as disclosed by the prior art. As a matter of fact, the above references neither disclose nor exemplify any beneficial effect of said ether and ester monomers with regard to processability and particularly the impact/flow balance when said monomers are part and portion of the elastomeric spine polymer.

4. Description of the Drawing

FIG. 1 is a graph which shows the general and preferred limits of the monomer composition which can be used in the present invention. The large trapezoid (a, b, c, d)

describes the general limits of monomers which are enclosed within the coordinates indicated as follows:

| Component | Coordinates (percent by weight) | | | |
|---|---|---|---|---|
| | a | b | c | d |
| Vinyl aromatic | 80 | 80 | 45 | 59 |
| Acrylonitrile | 19 | 5 | 40 | 40 |
| Alkyl vinyl ether and/or vinyl ester | 1 | 15 | 15 | 1 |

The preferred limits are described by the small trapezoid (e, f, g, h) and the limits are as follows:

| Component | Coordinates (percent by weight) | | | |
|---|---|---|---|---|
| | e | f | g | h |
| Vinyl aromatic | 75 | 75 | 63 | 68 |
| Acrylonitrile | 23 | 18 | 30 | 30 |
| Alkyl vinyl ether and/or vinyl ester | 2 | 7 | 7 | 2 |

5. Description of Preferred Embodiments

The present invention relates to the preparation of an impact resistant gum plastic using acrylonitrile, butadiene and styrene monomers and alkyl vinyl ether and/or vinyl ester monomers, wherein the use of said alkyl vinyl ether and/or vinyl ester monomers eliminate a serious problem experienced with the bulk-suspension prepared ABS.

The bulk-suspension process is particularly suited to the interpolymerization of styrene, acrylonitrile and a rubber (ABS) although emulsion type polymerization processes may be used. The bulk stage of the process comprises the steps of dissolving a rubbery polymer in a mixture of styrene and acrlylonitrile and/or equivalents, prepolymerizing the resulting solution in bulk to 10 to 45%, preferably 25 to 40% conversion. The suspension stage consists of suspending the prepolymer reaction product in water and polymerizing the resulting mixture to completion to obtain the interpolymer product.

The elastomer used is a rubber such as natural rubber, nitrile rubber, polyisoprene, polychloroprene and acrylate rubbers, also ethylene-propylene copolymers and ethylene-propylene terpolymers containing copolymerizable polyenes such as 1,4-hexadiene, dicyclopentadiene, methylene norbornene, ethylidene norbornene, etc., as well as mixtures of these elastomers, preferably poly (butadiene) or poly (butadiene-co-styrene) with a styrene content of up to 40% by weight. The elastomer usually is a linear and/or essentially ungelled rubber and may be prepared by methods well known in the art. The Mooney number of the elastomer is usually between 10 and 100, preferably between 15 and 25, as measured on the Mooney viscometer at 212° F. (ML–4) (ASTM D1646–63).

In accordance with the present invention, between about 5% and 35% by weight, and preferably 7% and 18% of a rubber is dissolved in a mixture of monomers containing 1 to 15% preferably 2 to 7% by weight of alkyl vinyl ether and/or vinyl ester, between 45% and 80% by weight, preferably 63%–75% by weight of a monovinyl aromatic compound, or a mixture of a monovinyl aromatic compound with a mono vinylidene aromatic compound, and between 5% and 40% by weight, preferably 18% to 30% by weight of an ethylenically unsaturated nitrile monomer such as acrylonitrile and methacrylonitrile, and the polymerization reaction is carried out using the standard bulk suspension process described previously.

Alkyl vinyl ethers and vinyl esters suitable for the purpose of this invention have the following general formula $$CH_2=CH-R$$

where R may be —OR' or $$-O\overset{O}{\overset{\|}{C}}R',$$

R' being a linear or branched alkyl radical of from 5 to 20 carbon atoms such as n-pentyl, neopentyl, 2-methylbutyl, n-hexyl, 2,3-dimethylpentyl, 2-ethylbutyl, n-heptyl, 3-ethylpentyl, 2,4-dimethylpentyl, n-octyl, 2-ethylhexyl, isooctyl, 2,3-dimethylhexyl, n-nonyl, 2-propylhexyl, 2,3,4-trimethylhexyl, n-decyl, 2,2 - diethylhexyl, 1-ethyl-1-propylpentyl, 1,1-dipropylbutyl, n-undecyl, 2-propyl-3-ethylhexyl, n-dodecyl, 3-methyl-2-butylheptyl, 2,3,4-triethylhexyl, n-tridecyl, 2-propyl-3-ethyloctyl, 4,4-diethylnonyl, 3-propyl-5-ethyloctyl, n-tetradecyl, 2,4,6-triethyloctyl, n-pentadecyl, 2-methyl-4,4-dipropyloctyl, n-hexadecyl, 3,3,4,5-tetraethyloctyl, 3-butyl - 2 - pentylheptyl, cetyl, n-heptadecyl, 4,4-diethyl-3-pentyloctyl, n-octadecyl, 1,1,2,5-tetramethyltetradecyl, 2,2-dipropyl - 3,5 - dimethyldecyl, n-nonadecyl, 3-pentyl-2,4-dipropyloctyl, 1,3,3,3,-tetraethylundecyl, eicosyl, 4,4-diethyl-5,6-dipropyldecyl.

Preferred monomers are vinyl 2-ethylhexyl ether, vinyl cetyl ether and vinyl n-octadecyl ether, as well as vinyl neodecanoate (also known as vinyl 1,1-dimethyloctanoate), and vinyl esters from alpha, alpha-dialkyl saturated aliphatic carboxylic acids having from 9 to 11 carbon atoms. The above mentioned alkyl vinyl ethers and vinyl esters may be used alone or as mixtures thereof.

Suitable monovinyl aromatic compounds used are styrene, vinyl toluene, vinyl xylene, or chlorostyrene, or a mixture of monovinyl aromatic compounds such as alpha-methylstyrene, alpha-ethylstyrene, p-chloro-alpha-methylstyrene and monovinylidene aromatic compounds such as where the monovinylidene aromatic compound replaces up to 25% by weight of the monovinyl aromatic compound.

From 3 to 5% by weight alkyl vinyl ether and/or vinyl ester in the monomer mixture is usually sufficient to give 10% rubber polymer with the desired flow and impact and good overall physical characteristics.

In preparing a bulk-suspension polymer of the instant invention the rubber is dissolved in the monomers.

The solution of rubber in monomers is referred to as the prepolymerization cement. To this cement are added small amounts of chain transfer agents, free radical initiators and, optionally, antioxidants.

The chain transfer agent can be any of the compounds known in the art to serve as such, for example, bromoform, alpha-methylstyrene dimer and the alkyl mercaptans. The preferred agents are tertiary mercaptans in which the alkyl group consists of 12 to 16 carbons, or a mixture of such mercaptans. The amount to be used will vary depending upon the efficiency of the agent used and the degree of chain transfer desired. Of the preferred agents, amounts of 0.5 to 6 parts per 1,000 parts of prepolymerization cement are preferred.

The prepolymer cement containing the additives is reacted, with rapid stirring and under a nitrogen atmosphere, until 10 to 45% preferably 25 to 40% conversion is reached. The resulting prepolymer is then suspended as droplets using an aqueous solution of poly(vinyl alcohol) or other well known suspending agents such as hydroxyethylcellulose, carboxymethylcellulose, sulfonated polystyrenes, polyglycol ethers and others. The reaction is continued until the polymer droplets become hard beads at 95 to 100% conversion.

It is necessary that antioxidants be added to the reactants at some stage of the reaction in order to prevent or inhibit oxidation of the rubber spine when the polymer is subjected to post reaction drying, milling, molding, mixing or any other process which may be required. The antioxidant consists of one or a mixture of any of the compounds known in the art to serve the desired purpose, and the amount to be used will vary depending upon the particular compound used. The antioxidant may be added at any time throughout the reaction, but preferably it is added immediately before suspension of the prepolymer.

The temperature at which the reaction is carried out is generally between 40° and 160° C. and will influence the free-radical initiator to be employed. The free radical initiator used is any of those commonly used in free radical reactions, e.g., such peroxy compounds as dicumyl peroxide, benzoyl peroxide, di-tert-butyl peroxide, or azo compounds such as azobisisobutyronitrile. At elevated reaction temperatures such as above 90° C., the initiator may be omitted since the reaction will proceed thermally.

It is preferred that the bulk stage of the polymerization reaction be run at 90–100° C. and the suspension stage be run at 100–150° C.

Usually a peroxide of an elevated decomposition temperature is added to cause crosslinking of the rubber after the graft polymerization is complete. After completion of the reaction, the polymer beads are recovered. The beads are filtered, washed and dried at a temperature of between 50° C. and 90° C. If further crosslinking of the rubber is desired the beads may be heated under pressure, between the platens of a press or in the barrel of an extruder or any other suitable equipment for sufficient time to decompose any residual peroxide present in the polymer beads.

ABS type polymers, according to the invention, may be considered to be polyblends of which the graft portion comprises about 20% to 90% of a rubbery spine, and correspondingly 80% to 10% polymeric chains chemically linked to said spine, these chains comprising from about 45% to 80% of a copolymerizable alkenyl aromatic monomer, 5% to 40% of an ethylenically unsaturated nitrilic monomer and from 0% to 15%, all by weight, of an alkyl vinyl ether and/or vinyl ester monomer having from 5 to 20 carbon atoms in the alkyl radical, i.e. R' of general formulae; the resin portion, prepared all or in part with the graft portion, usually comprising about from 45% to 80% of an alkenyl aromatic monomer, 5% to 40% of an ethylenically unsaturated nitrilic monomer and from about 1% to 15%, all by weight, of an alkyl vinyl ether or vinyl ester monomer, as defined above. Such polyblends may have an alkyl vinyl ether and/or vinyl ester monomer content of as low as about 0.8%, preferably about 1.8%, most preferably about 2.65% by weight.

The following examples serve to illustrate the present invention.

Example 1

To two 2-liter resin flasks are added identical amounts of the following recipe:

|  | Gr. |
|---|---|
| Poly(butadiene (90%)-co-styrene (10%)) | 49 |
| Styrene | 259 |
| Acrylonitrile | 90 |
| Cetyl vinyl ether | 11 |
| Mixed tert. mercaptan ($C_{14}$–$C_{16}$) | 1.2 |
| Dicumylperoxide | 0.4 |

The flasks are fitted with a condenser and the mixture heated to 95–97° C. with a steam bath. After two hours when one of the prepolymers has reached 10% monomer conversion, and after eight hours the other prepolymer has reached 40% monomer conversion, the resulting prepolymers are cooled, and an antioxidant, consisting of a mixture of about 0.8 gr. of an alkylated bisphenol (sold under the trademark Naugawhite) and about 2.0 gr. ditridecylthiodipropionate, and about 0.8 gr. azobisisobutyronitrile are then added. The prepolymers are suspended in an aqueous solution of poly(vinylalcohol) (.2% concentration) in each flask and the reaction is continued under a nitrogen atmosphere in a 70° C. water bath. After ten and five hours respectively, when the suspension reaction is complete in each instance, the polymer beads are filtered, washed and dried at 60° C. The rubber is then crosslinked by heating the beads in a press under pressure (ca. 20,000 p.s.i.) at 177–180° C. for about 5 minutes.

Example 2

The procedure described in Example 1 is followed except when 30% conversion is reached, the prepolymer is cooled and the antioxidant is added, but no azobisisobutyronitrile is charged. The prepolymer is transferred to a high pressure reactor and suspended in an aqueous solution of poly(vinyl alcohol) (about 0.2%), and the reaction is completed at 100–130° C. The polymer is isolated and the rubber crosslinked as disclosed in Example 1.

Example 3

The procedure used in Example 2 was followed. The temperature is increased, over a 12 hour period, from 100° C. to 150° C. in the suspension stage. The purpose of the temperature increase to 150° C. is to force as high a conversion of monomers to polymer as possible as well as to cross link the rubber. This eliminates the need for a crosslinking procedure after polymer recovery.

The examples described in Table 1 further illustrate the invention. Examples 4 through 7 demonstrate the impact strength and flow properties possessed by regular bulk-suspension ABS polymers. Examples 8 through 12 demonstrate the improved impact/flow balance obtained when a monomer of the invention is present in the monomer mixture and is incorporated into the polymer.

In all instances the rubber spine used is essentially a non-gelled SBR polymer prepared by the emulsion process having a Mooney number of 19 as measured on the Mooney viscometer at 212° F. (Ml–4). The spine used in examples 4, 5 and 8 contains 5 weight percent styrene and the spine used in the other examples contains 10 weight percent styrene.

The rubber spine was dissolved, with stirring at room temperature, in the monomers indicated in Table 1, the amount of rubber being such that it accounted for 10% by weight of the prepolymerization cement. Dicumyl peroxide (0.1 pph. of prepolymer cement) and a mixture of C–12, C–14, C–16 tertiary mercaptans (MTM), the amount indicated in Table 1, were added. The bulk step of the reaction was then carried out at 97° C. with rapid agitation. When 15 to 45% monomer conversion was reached, the prepolymer was cooled and a mixture of alkylated bisphenol and ditridecylthiodiprionate antioxidant (0.48 pph. total based upon weight of the prepolymer) was added.

A suspension stage initiator, azobisisobutyronitrile (0.2 parts per hundred parts of rubber and monomers), was also added when the suspension step was run at a temperature employed in the examples as listed in Table 1. For those reactions run at 110° C., no further addition of initiator was made.

The prepolymer was then suspended with an aqueous solution consisting of 0.2% poly(vinyl alcohol) (viscosity of 4% aqueous solution at 20° C. is 34–45 cp.), and the temperature was increased to that indicated for the suspension stage. When the reaction was complete, the hard beads were filtered, washed and dried at 60° C. The graft polymer was then crosslinked by heating the beads, under 2000 to 6000 p.s.i. pressure in a press, for 5 minutes at 180° C. The resulting material was milled at 160° C. for 10 minutes and compression molded into test pieces. The impact resistance and flow (Mooney number) of each polymer were determined and are listed in Table 1.

The flow value listed was obtained using a model ST-1 Mooney viscometer (Scott Testers Inc.). The procedure used in obtaining the plastic Mooney value is similar to that used in measuring rubber Mooneys according to ASTM D–1646–63 except that the mooney cavity is heated to 350° F.

TABLE 1.—POLYMERIZATION EXAMPLES

| Example | 4 | 5 | 6 | 7 | 8 | 9 | 10 | 11 | 12 |
|---|---|---|---|---|---|---|---|---|---|
| Monomer mixture: | | | | | | | | | |
| Percent styrene | 70 | 70 | 70 | 70 | 69.4 | 72 | 68.9 | 68.9 | 68.9 |
| Percent acrylonitrile | 30 | 30 | 30 | 30 | 25.0 | 25 | 26.1 | 26.1 | 26.1 |
| Percent cetyl vinyl ether | | | | | 5.6 | 3 | | | |
| Percent ethyl hexyl vinyl ether | | | | | | | 5.0 | | |
| Percent vinyl neodecanoate | | | | | | | | 5.0 | |
| Percent VETA [a] | | | | | | | | | 5.0 |
| MTM (p.p.h.) [b] | 0.4 | 0.5 | 0.3 | 0.3 | 0.4 | 0.3 | 0.4 | 0.4 | 0.4 |
| Azobisisobutyronitrile (p.p.h.) | 0.2 | 0.2 | | 0.2 | | ᵉ 0.4 | 0.2 | 0.2 | 0.2 |
| Percent monomer conv. (bulk (stage)) | 31 | 31 | 20 | 15 | 24 | 29 | 43 | 31 | 38 |
| Suspension temp. (° C.) | 70 | 70 | 110 | 70 | 110 | 70 | 70 | 70 | 70 |
| Impact [c] | 2.11 | 1.41 | 2.67 | 1.88 | 3.21 | 5.00 | 3.47 | 5.62 | 4.91 |
| Flow [d] | 35 | 22 | 52 | 39 | 17 | 34 | 24 | 25 | 31 |
| (I/F)×10⁻² [f] | 6.0 | 6.1 | 5.1 | 4.8 | 18.9 | 14.7 | 14.5 | 22.5 | 15.8 |

[a] Vinyl ester of a saturated tertiary carboxylic acid of 10 carbons.
[b] Mixture of tertiary mercaptans—60% C-12, 20% C-14, 20% C-16.
[c] Compression molded, ⅛″ notched, ft.-lbs./in. of notch (ASTM D-256-56).
[d] 350° Mooney number at 2 r.p.m. (M1-5).
[e] Added in two portions.
[f] (Impact/Flow)×10⁻².

In order for an ABS polymer to qualify as a good injection molding compound, the Mooney value should be 35 or less, preferably 30 or less (the lower the Mooney number the better the flow). For example, commercial injection molding grade ABS compounds generally have a Mooney number of 20 to 30. If the Mooney number is higher, such as 40 to 60, the material can be injection molded only with great difficulty requiring excessive heat and pressures.

Examples 4 and 5 show the typically poor impacts obtained in 10% rubber bulk-suspension ABS when the flow is such that the polymer qualifies for injection molding. Examples 6 and 7 show that the desired minimum impact of 3.0 ft./lbs. is not reached even when the Mooney number is as high as 52. When the invention is practiced, examples 8 through 12, the polymers easily qualify for injection molding and have impacts well above the 3 ft./lb. desired minimum.

Having thus described my invention, what I claim and desire to protect by Letters Patent is:

1. A polyblend composition comprising,
  (A) a graft portion containing from 20% to 90% by weight of a rubbery spine selected from the group consisting of polybutadiene and poly(butadiene-co-styrene) to which spine is grafted correspondingly from 80% to 10% of polymer chains containing from 45% to 80% by weight of an alkenyl aromatic compound, from 5% to 40% by weight of an ethylenically unsaturated nitrilic monomer and from 0% to 15% by weight of an alkyl vinyl ether or a vinyl ester, or mixtures, thereof, wherein the alkyl group contains 5 to 20 carbon atoms, in admixture with
  (B) a resin portion containing from 45% to 80% by weight of an alkenyl aromatic compound and from 5% to 40% by weight of an ethylenically unsaturated nitrilic monomer and from 1% to 15% by weight of an alkyl vinyl ether or a vinyl ester or mixtures thereof, wherein the alkyl group contains 5 to 20 carbon atoms,
    the ratios of (A) to (B) being such that the polyblend contains 5 to 35% of said rubbery spine based upon the total weight of the mixture.

2. The composition of Claim 1 wherein the alkenyl aromatic resin is styrene.

3. The composition of Claim 1 wherein the ethylenically unsaturated nitrile monomer is acrylonitrile.

4. The composition of Claim 1 wherein the vinyl ester is derived from alpha, alpha-dialkyl saturated aliphatic carboxlic acids having from 9 to 11 carbon atoms.

5. The composition of Claim 1 wherein the alkyl vinyl ether is selected from the group consisting of vinyl 2-ethylhexyl ether, vinyl cetyl ether and vinyl n-octadecyl ether.

References Cited

UNITED STATES PATENTS

| | | | |
|---|---|---|---|
| 3,280,219 | 10/1966 | Siebel et al. | 260—880 |
| 3,485,895 | 12/1969 | La Heij et al. | 260—880 |
| 3,671,607 | 6/1972 | Lee | 260—876 |
| 3,714,295 | 1/1973 | Nakayama | 260—880 |

JAMES A. SEIDLECK, Primary Examiner

U.S. Cl. X.R.

260—878 R, 880 R